United States Patent
Choi et al.

(10) Patent No.: US 11,929,490 B2
(45) Date of Patent: Mar. 12, 2024

(54) ANODE INCLUDING GRAPHITE AND SILICON-BASED MATERIAL HAVING DIFFERENT DIAMETERS AND LITHIUM SECONDARY BATTERY INCLUDING THE SAME

(71) Applicant: LG ENERGY SOLUTION, LTD., Seoul (KR)

(72) Inventors: Junghyun Choi, Daejeon (KR); Hyeon Min Song, Daejeon (KR); Joo Hwan Sung, Daejeon (KR); Han Sol Park, Daejeon (KR); Minsu Cho, Daejeon (KR); Sunghae Park, Daejeon (KR); Jingoo Kwak, Daejeon (KR); Younguk Park, Daejeon (KR); Sue Jin Kim, Daejeon (KR); Jinsu Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 698 days.

(21) Appl. No.: 17/048,416

(22) PCT Filed: Jun. 26, 2019

(86) PCT No.: PCT/KR2019/007739
§ 371 (c)(1),
(2) Date: Oct. 16, 2020

(87) PCT Pub. No.: WO2020/085609
PCT Pub. Date: Apr. 30, 2020

(65) Prior Publication Data
US 2021/0159488 A1 May 27, 2021

(30) Foreign Application Priority Data
Oct. 24, 2018 (KP) .................. 10-2018-0127487
Jun. 18, 2019 (KP) .................. 10-2019-0072306

(51) Int. Cl.
| | |
|---|---|
| *H01M 4/36* | (2006.01) |
| *H01M 4/02* | (2006.01) |
| *H01M 4/133* | (2010.01) |
| *H01M 4/134* | (2010.01) |
| *H01M 4/38* | (2006.01) |
| *H01M 4/48* | (2010.01) |
| *H01M 4/587* | (2010.01) |
| *H01M 10/0525* | (2010.01) |

(52) U.S. Cl.
CPC .......... *H01M 4/364* (2013.01); *H01M 4/133* (2013.01); *H01M 4/134* (2013.01); *H01M 4/386* (2013.01); *H01M 4/483* (2013.01); *H01M 4/587* (2013.01); *H01M 10/0525* (2013.01); *H01M 2004/021* (2013.01); *H01M 2004/027* (2013.01)

(58) Field of Classification Search
CPC ...... H01M 4/131; H01M 4/133; H01M 4/134; H01M 4/364; H01M 4/386; H01M 4/483; H01M 4/587; H01M 2004/021; H01M 2004/027
See application file for complete search history.

(56) References Cited

U.S. PATENT DOCUMENTS

| | | | |
|---|---|---|---|
| 9,508,982 B2 | 11/2016 | Kim et al. | |
| 9,806,329 B2 | 10/2017 | Choi et al. | |
| 2010/0183802 A1 | 7/2010 | Eguchi et al. | |
| 2016/0197342 A1* | 7/2016 | Lee ...................... | H01M 4/587 |
| | | | 429/223 |
| 2016/0233501 A1 | 8/2016 | Lee et al. | |
| 2016/0268591 A1 | 9/2016 | Choi et al. | |
| 2017/0117543 A1* | 4/2017 | Park .................... | H01M 4/1391 |
| 2018/0040880 A1* | 2/2018 | Andersen ............ | H01M 4/1395 |
| 2018/0062158 A1 | 3/2018 | Kim et al. | |

(Continued)

FOREIGN PATENT DOCUMENTS

| | | |
|---|---|---|
| CN | 108292745 A | 7/2018 |
| EP | 2879216 A1 | 6/2015 |
| JP | 2008-270788 A | 11/2008 |

(Continued)

OTHER PUBLICATIONS

Jung et al., "Electrochemical Characteristics of Silicon/Carbon Composites with CNT for Anode Material", Korean Chem. Eng. Res., 54(1), pp. 16-21, (2016) (see English abstract).

(Continued)

*Primary Examiner* — Scott J. Chmielecki
(74) *Attorney, Agent, or Firm* — Bryan Cave Leighton Paisner LLP

(57) ABSTRACT

The present disclosure relates to an anode for a lithium secondary battery, wherein an anode material layer is formed on at least one surface of an anode current collector, and
the anode material layer includes large-particle graphite, a small-particle silicon-based material, and fine-particle graphite, and satisfies the following conditions 1 to 3:

[Condition 1] Average diameter D50 of the large-particle graphite ($D_1$): 1 to 50 μm

[Condition 2] Average diameter D50 of the small-particle silicon-based material ($D_2$): $0.155D_1$ to $0.414D_1$

[Condition 3] Average diameter D50 of the fine-particle graphite ($D_3$): $0.155D_1$ to $0.414D_1$, or $0.155D_2$ to $0.414D_2$.

10 Claims, No Drawings

(56) References Cited

U.S. PATENT DOCUMENTS

2019/0273248 A1    9/2019   Yamada et al.
2021/0351432 A1   11/2021   Choi et al.

FOREIGN PATENT DOCUMENTS

| | | |
|---|---|---|
| JP | 2013-232414 A | 11/2013 |
| JP | 2015-164127 A | 9/2015 |
| JP | 2018-125077 A | 8/2018 |
| KR | 10-2013-0107892 A | 10/2013 |
| KR | 10-2014-0085822 A | 7/2014 |
| KR | 10-2015-0032014 A | 3/2015 |
| KR | 10-2015-0063620 A | 6/2015 |
| KR | 10-2016-0033638 A | 3/2016 |
| KR | 10-2016-0097677 A | 8/2016 |
| KR | 10-2016-0109946 A | 9/2016 |
| KR | 10-2018-0023820 A | 3/2018 |
| WO | 2005/011030 A1 | 2/2005 |
| WO | 2018/097212 A1 | 5/2018 |

OTHER PUBLICATIONS

International Search Report (with partial translation) and Written Opinion issued in corresponding International Patent Application No. PCT/KR2019/007739, dated Oct. 1, 2019.
Extended European Search Report issued by the European Patent Office dated Apr. 15, 2021 in a corresponding European Patent Application No. 19875427.7.

* cited by examiner

ANODE INCLUDING GRAPHITE AND SILICON-BASED MATERIAL HAVING DIFFERENT DIAMETERS AND LITHIUM SECONDARY BATTERY INCLUDING THE SAME

CROSS-REFERENCE TO RELATED APPLICATION

This application claims the benefits of Korean Patent Application No. 10-2018-0127487 filed on Oct. 24, 2018, and Korean Patent Application No. 10-2019-0072306 filed with the Korean Intellectual Property Office on Jun. 18, 2019, the disclosures of which are incorporated herein by reference in their entirety.

TECHNICAL FIELD

The present disclosure relates to an anode including graphite and a silicon-based material having different diameters, and a lithium secondary battery including the anode. Specifically, the present disclosure relates to an anode including large-particle graphite, a small-particle silicon-based material, and fine-particle graphite satisfying specific particle size conditions, and a lithium secondary battery including the anode.

BACKGROUND OF ART

The rapid increase in the use of fossil fuels has accelerated the demand for alternative energy sources and clean energy sources, and researches have been actively carried out into power generation and power storage using electrochemistry.

A typical example of an electrochemical device using such electrochemical energy is a secondary battery, which has been increasingly used in various fields.

Recently, technological development and increased demand associated with portable equipment such as portable computers, cellular phones and cameras have brought an increase in the demand for secondary batteries as an energy source. Among these secondary batteries, lithium secondary batteries having high energy density and operating electric potential, long lifespan and low self-discharge have been actively researched and are commercially available and widely used.

In addition, increased interest in environmental issues has led to a great deal of research into electric vehicles, hybrid electric vehicles or the like as alternatives to vehicles using fossil fuels such as gasoline vehicles and diesel vehicles. These electric vehicles and hybrid electric vehicles generally use nickel-metal hybrid secondary batteries as a power source. However, researches using lithium secondary batteries with high energy density and discharge voltage are currently underway and some are commercially available.

Materials including graphite are widely used as an anode active material of lithium secondary batteries. The materials including graphite have an average potential of about 0.2 V (based on Li/Li+) when releasing lithium, and the potential changes relatively uniformly during discharging. This has an advantage that the voltage of the battery is high and constant. Although the graphite materials have an electrical capacity per unit mass as low as 372 mAh/g, the capacity of graphite materials has been improved and now gets close to the theoretical capacity, so it is difficult to further increase the capacity.

For higher capacity of lithium secondary batteries, many anode active materials are being studied. As an anode active material with high capacity, a material which forms an intermetallic compound with lithium, for example, silicon or tin is expected to be a promising anode active material. Particularly, silicon is an alloy type anode active material having a theoretical capacity (4,200 mAh/g) that is at least about 10 times higher than graphite, and is today gaining attention as an anode active material of lithium secondary batteries.

However, silicon-based materials containing silicon causes a large volume change (~300%) during charging and discharging, resulting in breaking of physical contact between materials and spalling. As a consequence, ionic conductivity, electrical conductivity, and the like drastically decrease, so that practical initial lifetime characteristics tend to reduce sharply.

In order to improve the characteristics of the silicon-based material having a high theoretical capacity, various attempts such as Si/carbon composite have been made in a top-down manner. However, due to a complicated manufacturing process and low yield, they are not sufficient to commercialize it.

Therefore, it is necessary to develop a technique for improving the initial lifetime characteristics while using a silicon-based material as an active material of a lithium secondary battery.

DETAILED DESCRIPTION OF THE INVENTION

Technical Problem

The present invention has been made to solve the above problems and other technical problems that have yet to be resolved.

Specifically, the present disclosure is to provide an anode having improved initial lifetime characteristics while containing a silicon-based material as an active material by including large-particle graphite, a small-particle silicon-based material, and fine-particle graphite satisfying specific particle size conditions in the anode material layer, and a lithium secondary battery including the same.

Technical Solution

According to an embodiment of the present disclosure, provided is an anode for a lithium secondary battery, wherein an anode material layer is formed on at least one surface of an anode current collector, and
the anode material layer includes large-particle graphite, a small-particle silicon-based material, and fine-particle graphite, and satisfies the following conditions 1 to 3:
[Condition 1] Average diameter D50 of the large-particle graphite ($D_1$): 1 to 50 μm
[Condition 2] Average diameter D50 of the small-particle silicon-based material ($D_2$): $0.155D_1$ to $0.414D_1$
[Condition 3] Average diameter D50 of the fine-particle graphite ($D_3$): $0.155D_1$ to $0.414D_1$, or $0.155D_2$ to $0.414D_2$.

According to another embodiment of the present disclosure, provided is a lithium secondary battery including the anode for a lithium secondary battery.

The lithium secondary battery including the above-described anode has significantly improved initial lifetime characteristics while containing the silicon-based material as an active material.

Hereinafter, the anode and the lithium secondary battery according to embodiments of the present invention will be described in detail.

The terms are used merely to refer to specific embodiments, and are not intended to restrict the present disclosure unless it is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

DETAILED DESCRIPTION OF THE EMBODIMENTS

According to an embodiment of the present disclosure, provided is an anode for a lithium secondary battery, wherein an anode material layer is formed on at least one surface of an anode current collector, and
the anode material layer includes large-particle graphite, a small-particle silicon-based material, and fine-particle graphite, and satisfies the following conditions 1 to 3:
[Condition 1] Average diameter D50 of the large-particle graphite ($D_1$): 1 to 50 μm
[Condition 2] Average diameter D50 of the small-particle silicon-based material ($D_2$): $0.155 D_1$ to $0.414 D_1$
[Condition 3] Average diameter D50 of the fine-particle graphite ($D_3$): $0.155 D_1$ The average diameter (D50) is defined as a diameter at 50% of particle size distribution obtained based on a volume of the particles. The average diameter (D50) of the particles may be measured using, for example, a laser diffraction method.

For example, each particle is dispersed in a solution of water/triton X-100, and introduced into a commercially available laser diffraction particle size analyzer (for example, Microtrac S 3500). Thereafter, an ultrasonic wave of about 28 kHz is irradiated for 1 minute at an output of 60 W, and the average diameter (D50) at 50% of the particle size distribution can be calculated from the measuring instrument.

Each of the large-particle graphite and the fine-particle graphite may be at least one selected from the group consisting of natural graphite and artificial graphite.

The natural graphite has excellent adhesion, and the artificial graphite has excellent output characteristics and lifetime characteristics. Therefore, the type and the content ratio thereof may be appropriately selected.

It is not excluded that the above-mentioned large-particle graphite and fine-particle graphite are a mixture of natural graphite and artificial graphite. Thus, the large-particle graphite and the fine-particle graphite may be a mixture of natural graphite and artificial graphite. Alternatively, the large-particle graphite may be artificial graphite and the fine-particle graphite may be natural graphite, or vice versa.

In the case of a mixture containing both natural graphite and artificial graphite, a content ratio of natural graphite to artificial graphite may be 5:95 to 95:5, which is preferable in terms of performance of the secondary battery.

The natural graphite may have a specific surface area (BET) of 2 $m^2$/g to 8 $m^2$/g, or 2.1 $m^2$/g to 4 $m^2$/g. The artificial graphite may have a specific surface area (BET) of 0.5 $m^2$/g to 5 $m^2$/g, or 0.6 $m^2$/g to 4 $m^2$/g.

The specific surface area may be measured by a BET (Brunauer-Emmett-Teller) method. For example, it may be measured by a BET 6-point method according to a nitrogen gas adsorption-flow method a porosimetry analyzer (Belsorp-II mini manufactured by Bell Japan Inc.).

The larger specific surface area of the natural graphite, which exhibits excellent adhesion, is preferable. This is because, as the specific surface area is larger, mechanical interlocking effect of inter-particle adhesion through a binder may be sufficiently secured.

The shape of the natural graphite is not limited and may be spherical graphite, flake graphite, vein graphite, or amorphous graphite, and specifically spherical graphite, vein graphite, or amorphous graphite. More specifically, when a contact area between the particles is increased, a bonding area is increased and thus the adhesion is improved. Therefore, it is preferable that a tap density or a bulk density is large. In addition, it is also preferable that the grain orientation of the natural graphite shows anisotropy, so that the natural graphite may be spherical graphite or amorphous graphite.

Meanwhile, the shape of the artificial graphite is not limited and may be a powder type, a flake type, a block type, a plate type, or a rod type. Specifically, in order to exhibit the best output characteristics, a shorter moving distance of lithium ions is better. To shorten the moving distance to the electrode direction, it is preferable that the grain orientation of the artificial graphite shows isotropy, and therefore, the artificial graphite may be in the form of a flake or a plate, more specifically a flake.

The natural graphite may have a tap density of 0.9 g/cc to 1.3 g/cc, more specifically 0.92 g/cc to 1.15 g/cc, and the artificial graphite may have a tap density of 0.7 g/cc to 1.1 g/cc, more specifically 0.8 g/cc to 1.05 g/cc.

The tap density is measured by adding 50 g of a precursor to a 100 cc cylinder for tapping, and then tapping 3000 times using a JV-1000 measuring device (manufactured by COPLEY) and a KYT-4000 measuring device (manufactured by SEISHIN).

When the tap density is too small out of the above range, the contact area between the particles may not be sufficient, so that the adhesion may be deteriorated. When it is too large, tortuosity of the electrode and wettability of the electrolyte may be lowered, so that output characteristics during charging and discharging may be deteriorated, which is not preferable.

Regardless of the kind thereof, the large-particle graphite may have an average diameter D50 ($D_1$) of 1 μm to 50 μm, specifically 3 μm to 40 μm, more specifically 5 μm to 30 μm.

When the average diameter ($D_1$) of the large-particle graphite is too small, an initial efficiency of the secondary battery may be decreased due to an increase of the specific surface area, so that battery performance may be deteriorated. When the average diameter ($D_1$) is too large, rolling property of the electrode may be lowered, the electrode density may become difficult to realize, and the electrode surface layer may become uneven, resulting in low charge-discharge capacity.

The average diameter D50 (D3) of the fine-particle graphite may be $0.155 D_1$ to $0.414 D_1$, or 0.155D2 to 0.414D2 with respect to the average diameter D50 (D2) of the small-particle silicon-based material to be described below.

The fine-particle graphite needs to satisfy any one of the above two conditions in order to be appropriately located between the large-particle graphite and the small-particle silicon-based material to connect them for improving electron conductivity, in addition to exhibiting the capacity.

When the average particle diameter (D3) of the fine-particle graphite is too small, aggregation may occur and it is difficult to uniformly apply the fine-particle graphite onto a current collector when forming an anode material layer. When the average diameter (D3) is too large, adhesion may be deteriorated, and the fine-particle graphite cannot effectively penetrate between the large-particle graphite and the silicon-based material. That is, the fine-particle graphite may not sufficiently perform the role of connecting them, and accordingly, electron conductivity may be lowered, which is not effective in improving the initial lifetime characteristics.

More specifically, the average diameter (D3) of the fine-particle graphite may be $0.2D_1$ to $0.4D_1$ or $0.2D2$ to $0.4D2$.

The small-particle silicon-based material may be at least one selected from the group consisting of Si/C composite, $SiO_x$ (0<x<2), metal-doped $SiO_x$ (0<x<2), pure Si, and Si-alloy, and specifically $SiO_x$ (0<x<2) or metal-doped $SiO_x$ (0<x<2).

For example, the Si/C composite may have a structure in which a carbon material is coated on a particle surface obtained by firing when carbon is bonded to silicon or silicon oxide particles, a structure in which carbon is dispersed in an atomic state inside silicon particles, or a structure such as the silicon/carbon composite of PCT International Application WO 2005/011030 by the present applicant. The present disclosure is not limited thereto, as long as it is a composite of carbon and silicon material.

The silicon oxide may be 0<x1, and includes a structure in which a surface of the silicon oxide is treated with a carbon coating layer or the like.

In addition, the metal-doped $SiO_x$ (0<x<2) may be doped with at least one metal selected from the group consisting of Li, Mg, Al, Ca and Ti.

When doped as described above, an initial efficiency of the $SiO_x$ material may be increased by reducing $SiO_2$ phase, which is irreversible of the $SiO_2$ material, or by converting it into an electrochemically inactive metal-silicate phase.

The Si-alloy is an alloy of Si with at least one metal selected from the group consisting of Zn, Al, Mn, Ti, Fe, and Sn, and a solid solution, an intermetallic compound, an eutectic alloy therewith may be included. However, the present invention is not limited thereto.

The small-particle silicon-based material may have an average diameter D50 (D2) of $0.155D_1$ to $0.414D_1$, specifically $0.2D_1$ to $0.4D_1$.

Although the silicon-based material has a very high capacity, there is a problem that conductivity is poor compared to graphite, and the initial capacity and efficiency are not well realized. However, when the silicon-based materials are placed between the large-particle graphite particles, they are in good contact with the graphite, so that a conductive path is formed properly, resulting in stable capacity and efficiency.

Herein, when the average diameter (D2) of the silicon-based material satisfies the above range, the silicon-based material is appropriately positioned between the large-particle graphite particles and a conductive path is formed properly, resulting in good capacity and efficiency.

When the average diameter (D2) of the small-particle silicon-based material is too small out of the above range, even though the silicon-based materials are distributed among the large-particle graphite particles, the silicon-based materials may be aggregated and many electrolyte side reactions may occur, resulting in the low initial efficiency. When the average diameter (D2) is too large, the silicon-based materials are not distributed between the large-particle graphite particles, so that the capacity and efficiency of the anode may be insufficient, resulting in overall degradation.

In the mean time, the anode material layer may include 30 to 99 wt % of the large-particle graphite, 0.5 to 40 wt % of the small-particle silicon-based material, and 0.5 to 30 wt % of the fine-particle graphite, based on a total weight of the large-particle graphite, the small-particle silicon-based material and the fine-particle graphite.

As described above, the present disclosure includes the silicon-based material as an active material to ensure a high capacity. Further, the present disclosure also includes both the large-particle graphite and the fine-particle graphite in order to improve insufficient conductivity of the silicon-based material.

In this case, since the small-particle silicon-based material is placed in the gap formed by the large-particle graphite, the silicon-based material and the graphite are in contact with each other and a conductive path of the silicon-based material is formed properly, resulting in stable capacity and efficiency.

As a result, it is preferable that the above-mentioned large-particle graphite is a main substance and the silicon-based material is located therebetween, so that the large.

Therefore, the anode material layer may include 30 to 99 wt %, specifically 50 to 98 wt %, more specifically 70 to 97 wt % of the large-particle graphite, and 0.5 to 40 wt %, specifically 1 to 30 wt %, more specifically 1.5 to 20 wt % of the small-particle silicon-based material, based on a total weight of the large-particle graphite, the small-particle silicon-based material and the fine-particle graphite.

Meanwhile, the fine-particle graphite may also have an effect of increasing the electron conductivity by being located between the particles of the above-mentioned large-particle graphite and the small-particle silicon-based material and connecting them, although it affects the capacity and efficiency like the large-particle graphite. The fine-particle graphite may be included in an amount of 0.5 to 30 wt %, specifically 1 to 20 wt %, more specifically 1.5 to 10 wt %, based on a total weight of the large-particle graphite, the small-particle silicon-based material and the fine-particle graphite.

The anode material layer is not limited to the above materials, and may further include a conductive material, a binder, or a conductive material and a binder.

The conductive material is not particularly limited as long as it is conventionally known and has electrical conductivity without causing chemical changes in the battery. Examples of the conductive material include carbon blacks such as carbon black, acetylene black, ketjen black, channel black, furnace black, lamp black and thermal black; conductive fibers such as carbon fiber and metallic fiber; metallic powders such as carbon fluoride powder, aluminum powder and nickel powder; conductive whiskers such as zinc oxide and potassium titanate; conductive metal oxides such as titanium oxide; polyphenylene derivatives; and the like.

The binder is used to assist in binding between the active material and the conductive material, and examples thereof include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber (SBR), fluorine rubber, various copolymers, and the like.

Herein, the conductive material and the binder may be contained in an amount of 0.1 to 30 wt %, specifically 0.5 to 10 wt %, more specifically 1 to 5 wt %, based on a total weight of the anode material layer, respectively.

The anode material layer may include an additional active material in addition to the above materials. For example, a carbon-based material such as amorphous hard carbon, low crystalline soft carbon, carbon black, acetylene black, ketjen black, super P, graphene, and fibrous carbon; metal composite oxide such as $Li_xFe_2O_3$ (0≤x≤1), $Li_xWO_2$ (0<x≤1), $Sn_xMe_{1-x}Me'_yO_z$ (Me: Mn, Fe, Pb, Ge; Me': Al, B, P, Si, a Group 1, Group 2 or Group 3 element of periodic table, halogen; 0≤x≤1; 1≤y≤3; 1≤z≤8); lithium metal; lithium alloy; tin alloy; metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; a Li—Co—Ni-based material; titanium oxide; lithium titanium oxide, and the like may be further included.

In addition, the anode material layer may further include a filler or the like.

The filler is optionally used as a component to inhibit expansion of the cathode. The filler is not particularly limited as long as it is a fibrous material that does not cause chemical changes in the battery. For example, olefin-based polymers such as polyethylene and polypropylene; and fibrous materials such as glass fiber and carbon fiber may be used.

In the mean time, the anode material layer may be composed of large-particle graphite, a small-particle silicon-based material, and fine-particle graphite, and a binder, or may be composed of large-particle graphite, a small-particle silicon-based material, and fine-particle graphite, a binder, and further a conductive material.

The anode current collector may generally be formed to have a thickness of 3 to 200 μm. The anode current collector is not particularly limited as long as it has electrical conductivity without causing chemical changes in the battery. For example, it may be copper; stainless steel; aluminum; nickel; titan; sintered carbon; copper or stainless steel surface-treated with carbon, nickel, titan or silver; an aluminum-cadmium alloy; or the like. Further, similarly to the cathode current collector, the anode current collector may form fine irregularities on its surface to increase adhesive force of the anode active material, and various forms such as a film, a sheet, a foil, a net, a porous body, a foam body, and a nonwoven fabric body may be used.

According to another embodiment of the present disclosure, provided is a lithium secondary battery including the anode for a lithium secondary battery.

The lithium secondary battery may have a structure in which an electrode assembly including a cathode and a separator together with the anode is embedded in a battery case with an electrolyte.

The cathode may be prepared, for example, by applying a cathode material mixed with a cathode active material and a binder onto a cathode current collector, and if necessary, a conductive material and a filler may be further added as described in the anode.

The cathode current collector may generally be formed to have a thickness of 3 to 200 μm. The cathode current collector is not particularly limited as long as it has electrical conductivity without causing chemical changes in the battery. For example, it may be stainless steel; aluminum; nickel; titanium; aluminum or stainless steel surface-treated with carbon, nickel, titanium or silver; or the like, and it may preferably be aluminum. The current collector may form fine irregularities on its surface to increase adhesive force of the cathode active material, and various forms such as a film, a sheet, a foil, a net, a porous body, a foam body, and a nonwoven fabric body may be used.

The cathode active material may be, for example, a layered compound such as lithium cobalt oxide ($LiCoO_2$), lithium nickel oxide ($LiNiO_2$), or a compound substituted with one or more transition metals; lithium manganese oxide such as $Li_{1+x}Mn_{2-x}O_4$ (wherein, x is 0~0.33), $LiMnO_3$, $LiMn_2O_3$, and $LiMnO_2$; lithium copper oxide such as $Li_2CuO_2$; vanadium oxide such as $LiV_3O_8$, $LiV_3O_4$, $V_2O_5$, and $Cu_2V_2O_7$; Ni-site type lithium nickel oxide such as $LiNi_{1-x}M_xO_2$ (wherein, M is Co, Mn, Al, Cu, Fe, Mg, B, or Ga, x is 0.01 to 0.3); lithium manganese composite oxide such as $LiMn_{2-x}M_xO_2$ (wherein, M is Co, Ni, Fe, Cr, Zn, or Ta, x is 0.01 to 0.1), and $L_2Mn_3MO_8$ (wherein, M is Fe, Co, Ni, Cu, or Zn); $LiMn_2O_4$ in which a part of Li is substituted with an alkaline earth metal ion; disulfide compound; $Fe_2(MoO_4)_3$; and the like. However, the present disclosure is not limited thereto.

Examples of the binder, conductive material, and filler are as described in the anode.

The separator may be made of the same material, but is not limited thereto. It may be made of materials different from each other depending on safety, energy density, and overall performance of the battery cell.

A pore size and porosity of the separator are not particularly limited, but the porosity may be in the range of 10 to 95% and the pore size (diameter) may be 0.1 to 50 μm. When the pore size and porosity are less than 0.1 μm and 10%, respectively, the separator may act as a resistive layer. When the pore size and porosity are more than 50 μm and 95%, respectively, it is difficult to maintain mechanical properties.

The electrolyte may be a non-aqueous electrolyte containing a lithium salt. The non-aqueous electrolyte containing a lithium salt is composed of a non-aqueous electrolyte and lithium salt, and examples of the non-aqueous electrolyte include a non-aqueous organic solvent, an organic solid electrolyte, an inorganic solid electrolyte, and the like, but are not limited thereto.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte include nitrides, halides and sulfates of lithium (Li) such as $Li_3N$, LiI, $L_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

The lithium salt is a material that is readily soluble in the non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, (CF$_3$SO$_2$)$_2$NLi, chloroborane lithium, lower aliphatic carboxylic acid lithium, lithium tetraphenyl borate, lithium imide, and the like.

The non-aqueous electrolyte may include, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like, in order to improve charge-discharge characteristics and flame retardancy, and the like. In some cases, a halogen-containing solvent such as carbon tetrachloride and ethylene trifluoride may be further added to give nonflammability, or carbon dioxide gas may be further added to improve high-temperature storage characteristics. FEC (Fluoro-Ethylene Carbonate), PRS (Propene sultone), and the like may be further added thereto.

In one specific example, the lithium salt such as LiPF$_6$, LiClO$_4$, LiBF$_4$, LiN(SO$_2$CF$_3$)$_2$, and the like is added to a mixed solvent of a cyclic carbonate such as EC and PC, which is a high-dielectric solvent, and a linear carbonate such as DEC, DMC and EMC, which is a low-viscosity solvent, to prepare a non-aqueous electrolyte containing a lithium salt.

The lithium secondary battery according to the present disclosure may be used in a device as a power source. The device may be, for example, a laptop computer, a net book, a tablet PC, a portable phone, an MP3, a wearable electronic device, a power tool, an electric vehicle (EV), a hybrid electric vehicle (HEV), a plug-in hybrid electric vehicle (PHEV), an electric bike (E-bike), an electric scooter (E-scooter), an electric golf cart, or an electric power storing system, but the present disclosure is not limited thereto.

Hereinafter, the present invention will be described in more detail with specific examples. However, these examples are for illustrative purposes only, and the invention is not intended to be limited by these examples.

<Example 1>(D$_2$: 0.4D$_1$, D$_3$: 0.23D$_1$)

After large-particle natural graphite (spherical type, D50: 15 μm), a silicon-based material (SiO, D50: 6 μm), and fine-particle artificial graphite (flake type, D50: 3.5 μm) were mixed in an anode active material weight ratio of 88:7:5, the mixture of the anode active material, CMC and SBR as binders were added to a solvent distilled water in a weight ratio of 98.6:0.7:0.7 to prepare an anode slurry.

The anode slurry was applied onto a copper foil having a thickness of 15 μm to a thickness of 150 μm. It was pressed to have a porosity of 25% and dried at 130° C. for about 8 hours under vacuum to prepare an anode.

<Example 2>(D$_2$: 0.4D$_1$, D$_3$: 0.33D$_2$)

An anode was prepared in the same manner as in Example 1, except that fine-particle artificial graphite having D50 of 2 μm was used.

<Example 3>(D$_2$: 0.4D$_1$, D$_3$: 0.23D$_1$)

An anode was prepared in the same manner as in Example 1, except that large-particle natural graphite (spherical type, D50: 15 μm), a silicon-based material (SiO, D50: 6 μm), and fine-particle artificial graphite (flake type, D50: 3.5 μm) were mixed in an anode active material weight ratio of 87:7:6 and used as an anode active material.

<Example 4>(D$_2$: 0.3D$_1$, D$_3$: 0.3D$_1$)

An anode was prepared in the same manner as in Example 1, except that large-particle natural graphite (spherical type, D50: 5 μm), a silicon-based material (SiO, D50: 1.5 μm), and fine-particle artificial graphite (flake type, D50: 1.5 μm) were used.

<Example 5>(D$_2$: 0.25D$_1$, D$_3$: 0.16D$_1$, D$_3$: 0.4D$_2$)

An anode was prepared in the same manner as in Example 1, except that large-particle natural graphite (spherical type, D50: 5 μm), a silicon-based material (SiO, D50: 2 μm), and fine-particle artificial graphite (flake type, D50: 0.8 μm) were used.

<Example 6>(D$_2$: 0.24D$_1$, D$_3$: 0.2D$_1$)

An anode was prepared in the same manner as in Example 1, except that large-particle natural graphite (spherical type, D50: 25 μm), a silicon-based material (SiO, D50: 6 μm), and fine-particle artificial graphite (flake type, D50: 5 μm) were used.

<Example 7>(D$_2$: 0.25D$_1$, D$_3$: 0.33D$_2$)

An anode was prepared in the same manner as in Example 1, except that large-particle natural graphite (spherical type, D50: 25 μm), a silicon-based material (SiO, D50: 6 μm), and fine-particle artificial graphite (flake type, D50: 2 μm) were used.

<Comparative Example 1>(not Satisfying D$_1$, D$_2$: 0.27D$_1$, D$_3$: 0.18D$_1$)

An anode was prepared in the same manner as in Example 1, except that large-particle natural graphite (spherical type, D50: 55 μm), a silicon-based material (SiO, D50: 15 μm), and fine-particle artificial graphite (flake type, D50: 10 μm) were mixed in an anode active material weight ratio of 88:7:5 and used as an anode active material.

<Comparative Example 2>(D$_2$: 0.133D$_1$, D$_3$: 0.23D$_1$)

An anode was prepared in the same manner as in Example 1, except that large-particle natural graphite (spherical type, D50: 15 μm), a silicon-based material (SiO, D50: 2 μm), and fine-particle artificial graphite (flake type, D50: 3.5 μm) were mixed in an anode active material weight ratio of 88:7:5 and used as an anode active material.

<Comparative Example 3>(D$_2$: 0.66D$_1$, D$_3$: 0.23D$_1$, 0.35D$_2$)

An anode was prepared in the same manner as in Example 1, except that large-particle natural graphite (spherical type, D50: 15 μm), a silicon-based material (SiO, D50: 10 μm), and fine-particle artificial graphite (flake type, D50: 3.5 μm) were mixed in an anode active material weight ratio of 88:7:5 and used as an anode active material.

<Comparative Example 4>(D$_2$: 0.4D$_1$, D$_3$: 0.03D$_1$, 0.083D$_2$)

An anode was prepared in the same manner as in Example 1, except that large-particle natural graphite (spherical type, D50: 15 μm), a silicon-based material (SiO, D50: 6 μm), and fine-particle artificial graphite (flake type, D50: 0.5 μm) were mixed in an anode active material weight ratio of 88:7:5 and used as an anode active material.

<Comparative Example 5>($D_2$: 0.4$D_1$, $D_3$: 0.53$D_1$, 1.33$D_2$)

An anode was prepared in the same manner as in Example 1, except that large-particle natural graphite (spherical type, D50: 15 μm), a silicon-based material (SiO, D50: 6 μm), and fine-particle artificial graphite (flake type, D50: 8 μm) were mixed in an anode active material weight ratio of 88:7:5 and used as an anode active material.

<Comparative Example 6>($D_2$: 0.133$D_1$, $D_3$: 0.013$D_1$, 0.1$D_2$)

An anode was prepared in the same manner as in Example 1, except that large-particle natural graphite (spherical type, D50: 15 μm), a silicon-based material (SiO, D50: 2 μm), and fine-particle artificial graphite (flake type, D50: 0.2 μm) were mixed in an anode active material weight ratio of 88:7:5 and used as an anode active material.

<Comparative Example 7>($D_2$: 0.66$D_1$, $D_3$: 0.53$D_1$, 0.8$D_2$)

An anode was prepared in the same manner as in Example 1, except that large-particle natural graphite (spherical type, D50: 15 μm), a silicon-based material (SiO, D50: 10 μm), and fine-particle artificial graphite (flake type, D50: 8 μm) were mixed in an anode active material weight ratio of 88:7:5 and used as an anode active material.

Comparative Example 8

An anode was prepared in the same manner as in Example 1, except that large-particle natural graphite (spherical type, D50: 15 μm) and a silicon-based material (SiO, D50: 6 μm) were mixed in an anode active material weight ratio of 93:7, and then the mixture of the anode active material, a point-type conductive material (denka black), CMC and SBR as binders were added to a solvent distilled water in a weight ratio of 97:1.6:0.7:0.7 to prepare an anode slurry.

Experimental Example 1

A cathode material mixture of 96 wt % of a cathode active material (mixture of $LiNi_{0.4}Mn_{0.3}Co_{0.3}O_2$ and $LiNiO_2$ in a weight ratio of 97:3), 2.3 wt % of Super-P (conductive material), and 1.7 wt % of PVDF (binder) was added to NMP (N-methyl-2-pyrrolidone; solvent) to prepare a cathode slurry, and then the cathode slurry was applied onto an aluminum foil having a thickness of 15 μm to a thickness of 150 μm. It was pressed to have a porosity of 23% and dried at 130° C. for about 12 hours under vacuum to prepare a cathode.

Secondary batteries were manufactured using the anodes prepared in the above Examples and Comparative Examples, the cathode, a polyethylene separator (Celgard, thickness: 20 μm), and a liquid electrolyte in which 0.5 wt % of vinylene carbonate (VC, additive) based on a weight of the electrolyte solvent and 1M of $LiPF_6$ were dissolved in a mixed solvent of ethylene carbonate and ethyl methyl carbonate at a volume ratio of 3:7.

These secondary batteries were charged and discharged for 300 cycles at 1.0 C in a voltage range of 2.5 V to 4.2 V, and the results are shown in Table 1 below.

TABLE 1

|  | 1 cycle | 300 cycles (%) |
|---|---|---|
| Example 1 | 100% | 62.01 |
| Example 2 | 100% | 61.88 |
| Example 3 | 100% | 64.87 |
| Example 4 | 100% | 65.67 |
| Example 5 | 100% | 66.88 |
| Example 6 | 100% | 60.24 |
| Example 7 | 100% | 60.59 |
| Comparative Example 1 | 100% | 35.23 |
| Comparative Example 2 | 100% | 40.12 |
| Comparative Example 3 | 100% | 45.66 |
| Comparative Example 4 | 100% | 49.37 |
| Comparative Example 5 | 100% | 49.67 |
| Comparative Example 6 | 100% | 42.07 |
| Comparative Example 7 | 100% | 46.45 |
| Comparative Example 8 | 100% | 52.66 |

Referring to Table 1, it was confirmed that when the conditions according to the present disclosure were all satisfied, the lifetime characteristics were remarkably improved. It was also confirmed that the effects of the present invention cannot be attained, when even one condition was not satisfied.

Those skilled in the art will appreciate that various modifications, additions and substitutions are possible, without departing from the scope and spirit of the invention as disclosed in the accompanying claims.

INDUSTRIAL APPLICABILITY

As described above, the anode according to the present disclosure has improved initial lifetime characteristics while containing a silicon-based material as an active material by including large-particle graphite, a small-particle silicon-based material, and fine-particle graphite satisfying specific particle size conditions in the anode material layer.

The invention claimed is:

1. An anode for a lithium secondary battery, wherein an anode material layer is disposed on at least one surface of an anode current collector, and the anode material layer comprises large-particle graphite, a small-particle silicon-based material, and fine-particle graphite, and satisfies the following conditions 1 to 3:
    condition 1: a diameter D50 of the large-particle graphite ($D_1$) is 1 to 50 μm;
    condition 2: a diameter D50 of the small-particle silicon-based material (D2) is 0.155$D_1$ to 0.414$D_1$; and
    condition 3: a diameter D50 of the fine-particle graphite ($D_3$) is 0.155$D_1$ to 0.414$D_1$, or 0.155$D_2$ to 0.414$D_2$.

2. The anode for a lithium secondary battery of claim 1, wherein the diameter D50 of the large-particle graphite ($D_1$) is 5 to 30 μm.

3. The anode for a lithium secondary battery of claim 1, wherein the diameter D50 of the small-particle silicon-based material ($D_2$) is 0.2$D_1$ to 0.4$D_1$.

4. The anode for a lithium secondary battery of claim 1, wherein the diameter D50 of the fine-particle graphite ($D_3$) is $0.2D_1$ to $0.4D_1$, or $0.2D_2$ to $0.4D_2$.

5. The anode for a lithium secondary battery of claim 1, wherein the small-particle silicon-based material comprises at least one selected from the group consisting of a Si/C composite, $SiO_x$ (0<x<2), metal-doped $SiO_x$ (0<x<2), pure Si, and a Si-alloy.

6. The anode for a lithium secondary battery of claim 5, wherein the metal-doped $SiO_x$ (0<x<2) is doped with at least one metal selected from the group consisting of Li, Mg, Al, Ca and Ti.

7. The anode for a lithium secondary battery of claim 1, wherein the anode material layer comprises 30 to 99 wt % of the large-particle graphite, 0.5 to 40 wt % of the small-particle silicon-based material, and 0.5 to 30 wt % of the fine-particle graphite, based on a total weight of the large-particle graphite, the small-particle silicon-based material and the fine-particle graphite.

8. The anode for a lithium secondary battery of claim 1, wherein the anode material layer further comprises a conductive material, a binder, or a mixture thereof.

9. The anode for a lithium secondary battery of claim 8, wherein the conductive material and the binder are contained in an amount of 0.1 to 30 wt % based on a total weight of the anode material layer, respectively.

10. A lithium secondary battery comprising the anode for a lithium secondary battery of claim 1.

\* \* \* \* \*